United States Patent [19]

Phipps

[11] 4,234,529
[45] Nov. 18, 1980

[54] METHOD AND APPARATUS FOR SHAPING PLASTIC FOAMS

[75] Inventor: Arthur L. Phipps, Los Osos, Calif.

[73] Assignee: Condec Corporation, Old Greenwich, Conn.

[21] Appl. No.: 970,377

[22] Filed: Dec. 18, 1978

[51] Int. Cl.² .................. B29D 27/00; B29F 3/012
[52] U.S. Cl. ................................ 264/51; 64/1 C; 64/1 S; 64/2 R; 64/13; 193/35 F; 264/101; 264/177 R; 308/215; 425/328; 425/376 B; 425/817 C
[58] Field of Search ............ 264/51, 53, 45.5, 48, 264/46.1, 101, 177 R; 425/4 C, 366, 362, 363, 372, 373, 817 C, 328, 376 B; 308/215; 198/780; 193/35 B, 35 F, 37; 64/1 C, 1 S, 2 R, 13, 23, 106, 185, 253, 254, 255

[56] References Cited

U.S. PATENT DOCUMENTS

| | | | |
|---|---|---|---|
| Re. 27,243 | 12/1971 | Sare et al. | 264/51 X |
| 2,141,433 | 12/1938 | Haas | 425/363 X |
| 2,586,089 | 2/1952 | Rhodes | 425/363 |
| 2,593,158 | 4/1952 | Lorig | 193/37 X |
| 2,594,591 | 4/1952 | Runton | 198/780 X |
| 2,740,157 | 4/1956 | McCurdy et al. | 264/53 |
| 2,772,548 | 12/1956 | Covington et al. | 64/2 R |
| 2,887,203 | 5/1959 | Baron | 193/37 |
| 2,915,109 | 12/1959 | Walton | 425/369 X |
| 3,157,935 | 11/1964 | Birch | 425/363 X |
| 3,216,810 | 11/1965 | Hainke | 65/255 X |
| 3,220,057 | 11/1965 | Walton | 425/369 X |
| 3,316,737 | 5/1967 | Hulley | 64/13 |
| 3,431,163 | 3/1969 | Gilbert | 264/48 X |
| 3,431,164 | 3/1969 | Gilbert | 264/48 X |
| 3,491,634 | 1/1970 | Tomshany | 198/780 X |
| 3,550,758 | 12/1970 | Stalker | 193/37 X |
| 3,647,329 | 3/1972 | Reifenhauser et al. | 264/53 X |
| 3,660,066 | 5/1972 | Pfluger | 65/106 X |
| 3,704,083 | 11/1972 | Phipps | 425/4 C X |
| 3,806,567 | 4/1974 | Graham et al. | 264/48 X |
| 3,853,525 | 12/1974 | Gorman | 65/253 X |
| 3,871,812 | 3/1975 | Phipps | 264/51 X |
| 3,897,528 | 7/1975 | Suh | 264/51 |
| 3,900,544 | 8/1975 | Johnson et al. | 264/53 X |
| 3,914,085 | 10/1975 | Kruelskie | 425/817 C X |
| 3,918,774 | 11/1975 | Nicholson | 198/780 X |
| 3,969,005 | 7/1976 | Traut | 308/215 X |
| 4,017,245 | 4/1977 | Lang | 264/46.1 X |
| 4,044,084 | 8/1977 | Phipps | 264/51 |

FOREIGN PATENT DOCUMENTS

| | | | |
|---|---|---|---|
| 451864 | 10/1948 | Canada | 264/53 |
| 46-11598 | 3/1971 | Japan . | |
| 48-869 | 1/1973 | Japan | 264/45.5 |
| 128969 | 10/1927 | Switzerland | 198/780 |
| 799749 | 8/1958 | United Kingdom | 198/780 |
| 1134775 | 11/1968 | United Kingdom | 65/185 |

Primary Examiner—Philip Anderson
Attorney, Agent, or Firm—Maky, Renner, Otto & Boisselle

[57] ABSTRACT

An improved method and apparatus is disclosed for shaping and forming plastic foams as a foamable extrudate is extruded through the orifice, preferably arcuate, of an extrusion die. Immediately adjacent and downstream of the die orifice are opposed sets of curved rollers, each having substantially the same center of curvature as the die orifice. The roller set on one side of the extrudate pass line is adjustable as a set with respect to and substantially parallel to the pass line, while the rollers of the set on the opposite side are adjustable individually each to float with controlled pressure against the extrudate as it expands and moves between the roller sets. Each roller is comprised of a plurality of thin, cylindrical, circular wafers which are drivingly interconnected and journaled on curved core shafts. The wafers of opposed rollers in each set are individually driven for rotation at a controlled speed so that each opposed pair of rolls acts as a traction drive for the extrudate as it exits radially from the die orifice, such rollers controlling the expansion and movement of the extrudate while minimizing cell distortion. A surface finisher is provided downstream of the roll sets which comprises opposed extrudate engaging planar surfaces positioned on opposite sides of the extrudate, one being adjustably yet fixedly supported while the other is adjustably and floatingly supported pivotally at its center of gravity to exert a controlled floating pressure on the extrudate.

69 Claims, 18 Drawing Figures

METHOD AND APPARATUS FOR SHAPING PLASTIC FOAMS

This invention relates to an improved method and apparatus for shaping and forming elongated bodies of plastic foam during formation of such bodies upon extrusion through a die orifice to obtain foam or cellular boards, slabs, or billets of substantially uniform thickness requiring little subsequent processing.

BACKGROUND OF THE INVENTION

In the production of rigid foam billet, boards or logs, a foamable thermoplastic resin such as styrene or polyurethane incorporating a blowing agent is extruded through a die orifice. As soon as the extrudate leaves the die orifice, it is at a much lower pressure, preferably a vacuum, and immediately begins to expand and move away from the die orifice. The extrudate will expand away from the die orifice increasing in size three dimensionally. If such expansion is not properly controlled and the extrudate properly drawn from the die orifice, particularly as the extrudate cools and begins to cure or set, undesirable dimensional variations may result such as corrugations as well as undesirable variations in density and cell orientation. Also, in the formation of boards, slabs and billets it is desirable to finish as nearly as possible at a uniform thickness the top and bottom planar surfaces of the board being formed. Accordingly, the finished product then need only be cut transversely with perhaps lateral edge trimming. It is of course important that the product be of uniform density, uniform thickness, and with minimum cell distortion. It is also important that the finished surface be free of distortions, surface blemishes or cracks.

Heretofore, a wide variety of roller, plate, or spreader bar arrangements have been employed to control and guide the formation of the expanding extrudate. Examples of such devices may be seen in the spreader bar of Winstead U.S. Pat. No. 3,632,266, the angularly related plates of Gilbert U.S. Pat. No. 3,431,163 and the idler roll arrangement seen in McCurdy et al U.S. Pat. No. 2,740,157.

In the case of idler rolls, such rolls can merely react to the force and movement of the extrudate moving therepast. Accordingly, it is preferred that such rolls should be driven to act in effect as traction rolls assisting in drawing the extrudate from the die orifice as it expands. In any die orifice, whether arcuate or linear, the extrudate will move past a straight roll at different speeds and in slightly different directions in view of lateral expansion. In extruding foamable resins such as styrenes, it is preferred to utilize a die having circular or parabolic, arcuate adjustable die lips such as seen in Phipps U.S. Pat. No. 3,871,812 or more preferably, as seen in the co-pending application of Arthur L. Phipps filed June 14, 1978, Ser. No. 914,580 entitled "Foam Extrusion Die Assembly". With such dies, the extrudate expands radially from the orifice defined by the die lips. Properly to assist the extrudate exiting the die orifice in this manner, the traction rollers assisting the movement of the extrudate and properly confining it to the desired shape should also, at least theoretically, be correspondingly curved. In this fashion, each portion of the driven roll will extend substantially normal to the movement of the extrudate therepast. Since the extrudate moves radially, the roller should be circular. To provide a circular roller, particularly one which can be rotated at a desired speed, and still one which can provide the desired pressure presents a complex problem.

Since any force exerted by an actuator acting on a roller assembly or a finishing surface above or below the extrudate path must compensate for the weight of the device being actuated in order to control precisely the pressures involved, applicants have devised a tare weight compensation control system for both the forming rolls and downstream surface finishing associated devices which permit both the rolls and the surface finisher to be floatingly supported and air balanced to compensate for its own weight so that the pressure exerted thereon toward the extrudate is the pressure exerted on the extrudate. In connection with the surface finishing device, it is supported at its center of gravity both to allow pivoting to compensate for slight further extrudate expansion and to permit a simplified system for air balancing and pressurizing the surface finisher.

SUMMARY OF THE INVENTION

The invention then comprises the method of and apparatus for controlling the forming and shaping of an extrudate as it expands from an extrusion die. The extrudate forming apparatus is positioned adjacent and immediately downstream of the extrusion die orifice which is preferably arcuate. On opposite sides of the extrudate path there is provided opposed sets of curved rollers extending generally circularly of the center of the die. Each roller comprises a polished or finished core shaft of uniform diameter and has journaled thereon, with or without bearings, a plurality of juxtaposed relatively thin circular wafers or discs which are drivingly interconnected. A drive motor for each roll rotates the wafers uniformly at the desired speed. The roller assemblies on at least one side of the extrudate path are air balanced or floated so that the pressure on the opposite side of the balance represents a more true approximation of the pressure of the roll directly against the extrudate.

After passing through the roller sets, the extrudate will pass through a surface finishing apparatus which may comprise relatively large area top and bottom plates or belts backed by such plates and one or both of such plates or belts may be floatingly supported in the same manner as each of the rolls of the set as aforedescribed. In order to permit one of the surface finishing devices to pivot, it is pivotally supported at its center of gravity, suitably counterweighted, and air balanced in the same manner as each roller assembly of at least one of the roller sets.

Although useful with regard to styrene foams, it will, of course, be appreciated that the present invention is equally applicable to the extrusion of other foams such as polyethylene, polypropylene, and polyvinylchloride, for example.

It is accordingly a principal object of the present invention to provide a method and apparatus for shaping and forming plastic foams utilizing an arcuate roller assembly, the arc thereof being struck from the center of the die.

Another important object is the provision of such roller assembly utilizing drivingly interconnected relatively thin circular wafers journaled on an arcuate core rod.

An important object is also the provision of such roller assembly wherein a plurality of such rolls may be employed, each being individually driven and urged against the extrudate with a precisely controlled pressure.

Yet another important object is the provision of such arcuate rollers which form a fan-shape array proximate the die on opposite sides of the extrudate path to assist, direct, and control the flow of extrudate exiting the die as it expands.

A further object is the provision of a unique arcuate drive roll employing a plurality of relatively thin feathered plastic wafers journaled on a curved core with or without bearings.

A yet further object is the provision of such arcuate roll assemblies which may individually be driven at a constant peripheral speed throughout the length thereof.

Another object is to provide a confining, yet controlling and directing fan-shape roller array on opposite sides of an arcuate orifice die properly to form and shape expanding foam extrudate in an extrusion line.

It is also of course a primary object to provide a process of directing, forming and shaping such foam extrudate by surface power assisting the extrudate into its desired final configuration.

Another object is the provision of a surface finishing device for such foam extrudate utilizing stationary or moving planar surfaces, at least one of which is air balanced for controlled pressure application against the surface of the extrudate and which is supported pivotally at its center of gravity.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

In said annexed drawings:

FIG. 1 is a side elevation partially broken away and in section of apparatus for shaping and forming plastic foam extrudates in accordance with the present invention;

DETAILED DESCRIPTION

The Apparatus—General Arrangement—FIGS. 1-4

Figure 2:
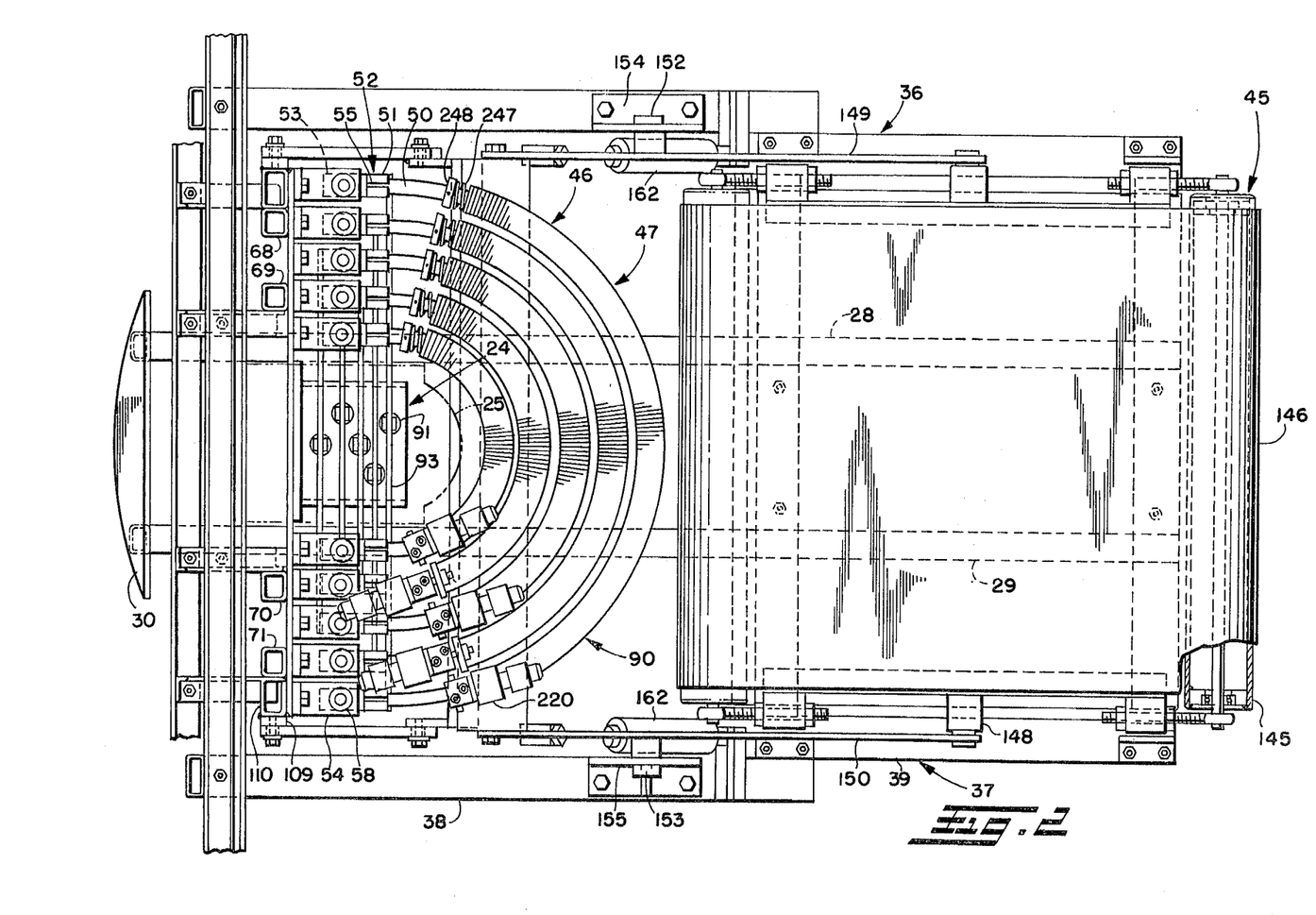
FIG. 2 is a top plan view of the apparatus of FIG. 1 taken substantially from the line 2—2 thereof.

Referring first to FIGS. 1 and 2 it will be seen that the shaping and forming apparatus of the present invention illustrated generally at 20 is supported to a certain extent on a frame 21 to project in cantilever fashion from ring 22 which, as indicated, is slightly inclined with respect to the horizontal. Such ring 22 may constitute the bearing plate of a bulkhead, not shown, adapted to close the upper end of an inclined barometric leg or vacuum chamber as seen more clearly in the co-pending application of Arthur L. Phipps filed July 10, 1978, Ser. No. 922,542 entitled "Extrusion Apparatus and Method". The invention however may equally well be used downstream of an atmospheric extrusion line.

The bulkhead also supports the extrusion die shown in phantom lines at 24 also as shown in such co-pending application Ser. No. 922,542, such die having an adjustable slot type arcuate orifice indicated generally at 25, through which extends the extrudate pass line or more accurately plane 26 seen in FIG. 1. Again, the die may be generally similar to the die assembly disclosed in Phipps application Ser. No. 914,580 filed June 14, 1978, entitled "Foam Extrusion Die Assembly".

The frame 21 may be fabricated essentially by welding from rectangular tubular steel elements and includes parallel substantially horizontal lower frame elements 28 and 29, the proximal ends of which are secured to plate 30 in turn mounted to the inside of the ring 22. The distal end of the frame members 28 and 29 are cut to accommodate transverse frame member 31 and such frame members are interconnected by plate 32. Each frame member is also provided with a relatively short oblique upstanding leg as seen at 33, such legs being interconnected by plate 34.

The lateral or outside frames 36 and 37 are each formed of two offset members as seen at 38 and 39 and are interconnected at their distal or outer ends by the frame member 31 and also at the offset by frame member 40. The frame members 40 and 31 may be secured as by fasteners to the plates 34 and 32, respectively, to form the rigid triangular frame 21. The proximal end of the frame members 36 and 37 may be secured to angle iron 42 extending horizontally and chordally of the ring 22 by the fasteners seen at 43. A primary purpose of the frame 21 is to support surface finishing assembly 45 downstream along the pass line 26 of the forming roll array assembly seen at 46.

Forming Roll Array Assembly

Such array assembly comprises an upper and lower set of curved rolls seen generally at 47 and 48, respectively, each of which may include as seen more clearly in FIG. 2 up to five concentric rolls. Although the illustrated embodiment shows a set of five top and bottom, each concentric, and each opposed to the corresponding roller assembly in the other set, it will be appreciated that fewer or more than five may be employed in one or the other set or both sets.

The rolls of the upper set each comprise a uniformly curved or arcuate core shaft as collectively seen at 50, each successive shaft having a different radius of curvature, the respective straight ends of which are securely clamped in the upwardly extending legs 51 of L-shape clamps 52. The lower rather thicker horizontal legs 53 of each clamp are secured to generally vertically extending rods 54. Such L-shape clamps may be provided with cylindrical bores in each leg thereof accommodating the ends of core rods 50 and the vertical rods 54, respectively, such bores being outwardly split as seen at 55 so that the core rods and vertical rods may be clamped thereto by the clamp screws or fasteners shown generally at 56. Each core rod 50 for the five roll assemblies illustrated is provided with an L-shape clamp at each end, and each L-shape clamp is secured to a respective vertically extending rod 54. Accordingly, for each of the five roll assemblies illustrated, there are ten such L-shape clamps, and ten such vertical rods 54. As seen in FIG. 1, such vertical rods are in their lowermost position.

Figure 3:
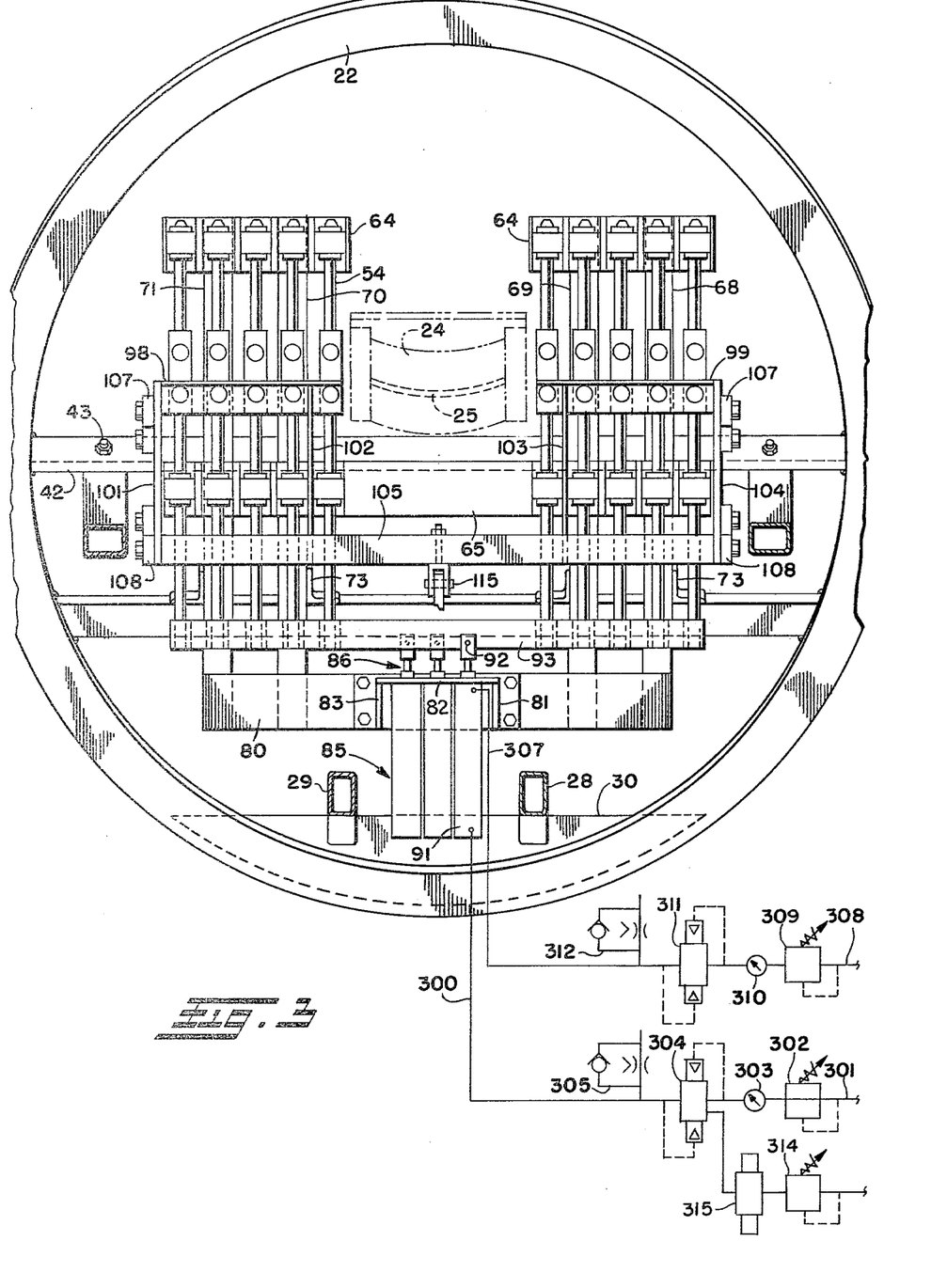
FIG. 3 is a substantially vertical section taken from the line 3—3 of FIG. 1 illustrating the support mechanism for the array of rolls forming the upper set.

Each such vertical rod is journaled for axial movement in linear bearings 58 and 59 supported respectively on arms 62 and 63, each secured to upper and lower plates 64 and 65, respectively, by the fasteners seen at 66. As seen more clearly in FIG. 3, there are two laterally spaced upper plates 64 which clear the die 24 therebetween. The upper plates 64 are connected to the top of vertically extending frame members 68 and 69 on one side of the die and 70 and 71 on the opposite side. The plate 65 spans below the die as seen in FIG. 3 and is connected to all four such vertical frame members. All four vertical frame members are supported from chordal angle 72 by respective bracing angles 73, each secured by the fasteners 74 and 75 seen more clearly in FIG. 1. The two inner vertical frames 69 and 70 are similarly connected to the upper angle 42 by angles 76 secured by fasteners 77. In this manner the vertical frames 68-71 are held rigidly in a substantially vertical position as shown in FIG. 1.

At the lower end of the four vertical frame members 68-71 there is a transverse plate 80 spanning all four frame members as seen in FIG. 3 to the center of which is secured bracket 81 which includes a projecting relatively large plate 82 rigidly supported by the laterally positioned gussets 83. To such plate is secured the rod ends of five pneumatic piston cylinder assemblies shown collectively at 85 with the rods 86 thereof projecting through the plate 82.

Figure 4:
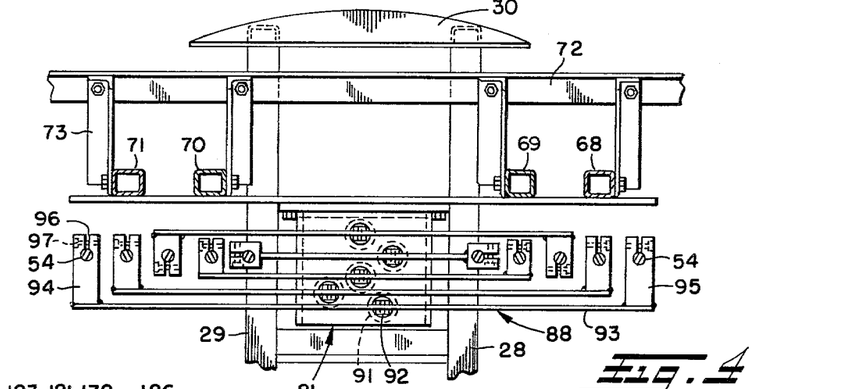
FIG. 4 is a fragmentary horizontal section taken substantially on the line 4—4 of FIG. 1 illustrating the manner in which the roll assemblies of the upper array are individually and independently supported.

As seen more clearly in FIGS. 2 and 4, each rod is clevis connected to a transverse yoke, such yokes being collectively indicated at 88. Although the clevis connection for each yoke may be somewhat off center, each yoke is slightly different though otherwise symmetrical. Accordingly, not all yokes will be described in detail.

For the outside or largest curved roll assembly 90 the core shaft 50 is clamped to the two outside vertical rods 54 and is operated generally vertically by the piston cylinder assembly 91 which is clevis-pin connected at 92 to yoke bar 93. As seen more clearly in FIG. 4, each end of the yoke bar 93 has welded thereto a rod clamp as seen at 94 and 95. Again, each rod clamp is provided with a cylindrical bore accommodating the vertical rod 54 and is split therebeyond as indicated at 96 so that the lower end of each rod may be securely clamped by the clamp fasteners 97. Accordingly, when the piston cylinder assembly 91 is extended the outside or larger arcuate roll 90 seen in FIG. 2 will move up and down independently of each of the others. As seen in FIG. 4, the yokes of each of the arcuate rolls are progressively shorter and the rod clamps on the ends thereof are of slightly different configurations to provide mutual clearance. In any event, the arcuate rolls of the upper array may be moved substantially vertically toward and away from the pass line 26 independently of each other. Because of the clamp and rod arrangement, the plane of curvature of each roll of the top array 47 remains parallel to the pass line 26.

The rolls of the lower array 48 are similarly constructed each being opposed to a roll of the upper array. Each includes a core shaft, opposite ends of which are respectively secured in angle brackets 98 and 99 on opposite sides of the die 24 slightly below the pass line 26. The top flange of each bracket is parallel to the pass line and the core rods may be secured thereto by suitable fasteners passing through such top flange. The back flange may be apertured to receive the rod ends. The bracket 98 on one side of the die as seen in FIG. 3 is supported between upstanding plates 101 and 102 while the bracket 98 on the opposite side of the die is supported by plates 103 and 104. A transverse tubular frame member 105 extends between and interconnects all of the vertical plates 101-104. As seen more clearly in FIG. 3, the outside plates 101 and 104 are somewhat thicker than the inner plates 102 and 103 and each of the outside plates is connected by parallelogram pivoting links 107 and 108 to plates 109 which are secured to relatively short tubular frame elements 110 each secured to the exterior of the outside vertical frames 68 and 71. In this manner the plates 101-104 at all positions thereof remain parallel to the frame members 68-71 and thus the vertical rods 54. The configuration of the brackets 98 and 99 maintains the curvature of the rolls of the lower array always in a single plane parallel to but below the pass line 26.

Movement of the bottom array of rolls is obtained by self-locking jackscrew 113, the vertically movable element 114 of which is pin connected at 115 to the transverse frame 105. The jack 113 is pivotally supported at 116 from bracket 117 mounted on transverse frame member 118 extending between the frame members 28 and 29. By means of the jack, the position of the plane of the lower array of curved rolls 48 can be closely adjusted with respect to the pass line 26. It will, of course, be appreciated that the rolls of both sets may be adjusted individually instead of only one set as illustrated.

Surface Finisher 45

The surface finisher 45 for the planar top and bottom surfaces of the extrudate to be formed such as a wide flat board, slab or billet comprises upper and lower planar extrudate surface-engaging assemblies which in the illustrated embodiment comprise upper and lower endless belt assemblies as seen at 120 and 121, respectively. The lower assembly 121 includes a frame 122 which includes a planar surface aluminum or light plate 123. The frame includes transverse end members 124 and 125 which adjustably support and secure the end journals for idler rolls 126 and 127, respectively, as illustrated. The end members are supported at each end by brackets as seen at 130 and 131 which are supported through shim stacks 132 and 133, respectively, secured to frame 21 as seen. The shims of each stack may be on the order of a half inch (12.7 mm.) in thickness and in this manner the lower assembly 121 may be positioned adjustably parallel to but somewhat spaced from the extrudate pass line 26.

The aluminum plate 123 is preferably covered with glass cloth impregnated with a polytetrafluoroethylene to impart to the upper surface thereof a high degree of lubricity. Trained around the rollers 126 and 127 is a relatively thin belt of glass cloth also impregnated with such polytetrafluoroethylene or other suitable high lubricity resin. Such rollers may, although illustrated as idler rollers, be power driven to move the belt at either the same speed as the extrudate, somewhat faster than the extrudate, or at a controlled speed slower than the extrudate to impart the desired wiping or surface finish action to the major planar surfaces of the product being formed.

The upper assembly 120 is similarly constructed but differently supported. The upper assembly includes a frame 140 supporting the covered aluminum plate 141 and includes end members 142 and 143 supporting the rolls 144 and 145 in the adjustable fashion indicated. Trained around the rolls 144 and 145 is a belt 146 of the same construction as the belt of the lower assembly.

The frame 140 includes a central transverse member 148 to which are pivotally connected the distal ends of arms 149 and 150. Such arms are provided with the pronounced elbow as seen more clearly in FIG. 1 and are pivoted at such elbow at 152 and 153, respectively, each to the apex of triangular stanchions or brackets 154 and 155 which are secured to the lateral elements 38 of the frame 21. The relatively shorter ends of the arms are each provided with plates 158 to which are secured counterweights 159. Also pivotally connected to each such plate at 160 are the rods 161 of respective pneumatic piston cylinder assemblies 162. In the manner illustrated, the upper assembly 120 is thus pivotally supported at its substantial center of gravity. Such pivoting mount of the upper assembly permits the assembly slightly to pivot as the extrudate passes between the upper and lower assemblies accommodating any slight further expansion of the extrudate. The piston cylinder assemblies 162 which are pivotally connected to the frame 21 as seen in FIG. 1 may be employed to float the upper assembly by compensating for the tare weight of such assembly and then by applying a controlled pressure to the rod ends of each assembly to force the upper assembly toward the top surface of the extrudate under precisely controlled pressure. The manner in which such pressure may be achieved and controlled will be hereinafter more clearly described.

Arcuate Roll Wafers—FIGS. 5-8

As indicated, the arcuate rolls are driven for controlled rotation to act as traction rolls to assist the extrudate as it expands radially from the die face to achieve its desired configuration. In order to provide a driving surface on such rolls, each roll comprises a plurality of stacked relatively thin plastic discs or wafers which are drivingly interconnected to each other. Such wafers may be mounted on the core shafts 50 of the various arcuate rolls of the upper and lower fan-shape array with or without ball bearing journals.

Figure 5:
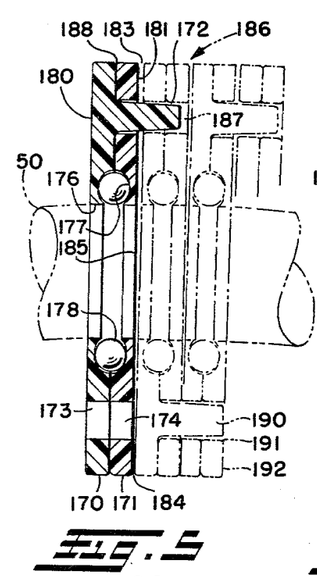
FIG. 5 is an enlarged diametral section of one form of wafer assembly which may be used with the curved roller assemblies of the present invention, such wafer assemblies comprising two joined sections serving to form and trap, when secured together, the balls of a ball bearing journal.

In FIG. 5 there is illustrated a preferred form of wafer construction if utilizing such ball bearing journals. Such wafers or segments may be injection molded from a variety of self-lubricating plastics such as nylon, polytetrafluoroethylene, or at certain temperatures, various acetyl resins will do. The resin is preferably reinforced with glass fiber and contains a certain amount of molybdenum disulfide as a lubricant additive. In FIG. 5 a segment is formed of two preassembled wafers as indicated at 170 and 171. Although the wafers are similar, they are not identical. The wafer 170, for example, may be provided with nine projecting pins 172 and nine holes or apertures 173, each equally spaced on 40° centers. However, the wafer 171 is provided with eighteen apertures 174 equally spaced on 20° centers. All of the pins and apertures are at the same radius and are circumferentially aligned. The center of each wafer is provided with a circular opening 176 accommodating the core shaft 50 and at such center opening the wafers are each provided with opposed ball half races as seen at 177. When assembled as indicated, the recesses in the opposed faces of the mating wafers form annular slightly radially elongated races for balls 178. The outside faces of the mating wafers as seen at 180 and 181 may be tapered slightly toward each other from the center aperture 176. In this manner at the radial outward edge of the curved roll, there will be slight gap between adjacent assembled segments as seen at 183. On the inner edge of the roll there may be no gap as seen at 184 and beneath the center of the core shaft where the roll contacts the extrudate, the gap at 185 will be approximately one-half to one-third the gap 183. The pins 172 are provided with an approximate 2° taper and fit with slight clearance through the apertures 174 in the mating wafer but with somewhat larger clearance through the aligned apertures in the adjacent assembled segment or wafer assembly 186 as seen at 187.

The wafers 170 and 171 may be pressembled with the balls 178 to form a complete segment and may be cemented or glued along the mating plane 188. When thus assembled, they may be stacked on the core shaft 50 with the pins 172 extending far enough to fit within two aligned apertures of the next adjacent assembled segment 186. As indicated at 190, the next adjacent assembled segment will have eight pins projecting through aligned apertures 191 in the assembled segment 192 and so on. The segments thus formed are stacked on the core shaft to form the desired extent of the driven arcuate drive roll and the segments are connected to the drive as hereinafter described. After being so connected, the core shaft is assembled in the supporting clamps. It should be noted that the wafers and segments formed thereby as seen in FIG. 5 have been found to work quite well utilizing no glue or solvent weld and also have been found to work quite well without balls in the races provided.

Figure 6:
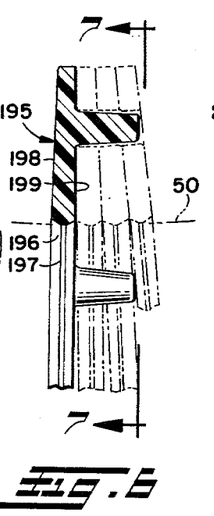
FIG. 6 is an enlarged fragmentary quarter section of a preferred form of wafer which may be mounted on the core shaft of the roller without bearings.
Figure 7:
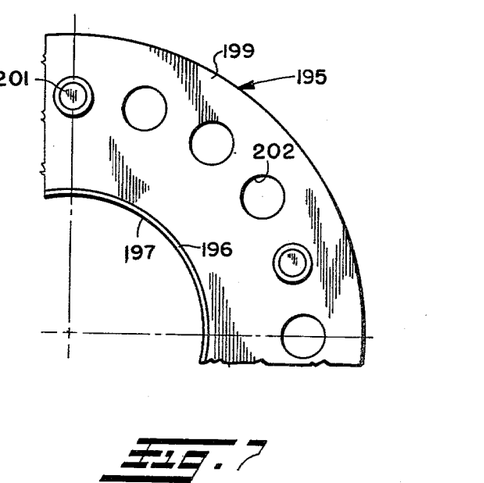
FIG. 7 is a fragmentary plan view of the wafer of FIG. 6.

In FIGS. 6 and 7 there is illustrated a preferred form of wafer for stacking on the core shafts 50 in the event ball bearings or other separate journals are not employed. The wafer 195 may be injection molded of the same plastic material as in connection with the wafer of FIG. 5. The wafer has a central opening 196, the center of which is tapered as indicated to a relatively thin flat ridge 197 which rotates against the exterior of the core shaft 50. The axial faces 198 and 199 of the wafer are tapered or feathered slightly from the aperture 196. The angle of the feather may be for example 0°20'. Each wafer is provided with five axially extending pins 201 and fifteen through apertures 202 as indicated in FIG. 7. The pins and apertures are on the same radius and the centers are equally spaced with three apertures being positioned between adjacent pins. Thus the pins and apertures are on 18° centers while the pins alone are on 72° centers. The pins, as in the FIG. 5 embodiment, are provided with a 2° taper and are axially sufficiently long to extend through the aligned apertures 202 of three adjacent wafers. The wafers are assembled on the core shaft simply by indexing the next wafer 18°. It will also be appreciated that commencing the radial taper or feathering of the wafer at the aperture 196 or the edge of the core shaft 50 reduces the gap between the wafers at their point of contact with the extrudate.

Figure 8:
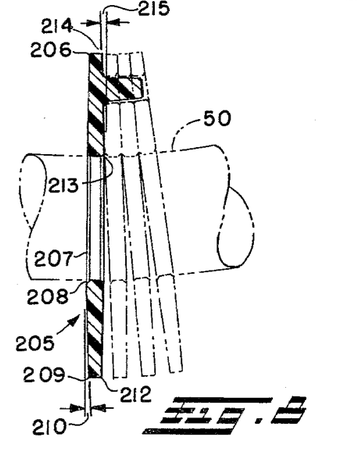
FIG. 8 is a transverse section of yet another wafer assembly having an asymmetrical feathered configuration.

In FIG. 8 there is illustrated another form of wafer which may be utilized without ball bearings. The wafer 205 of FIG. 8 may be injection molded from the same material as the wafers of FIGS. 5 and 6 and may include the same number of pins and apertures as the wafer 195 with the same circumferential spacing. The wafer 205 is, however, provided with an asymmetrical feathering or tapering. For example, from the corner 206 to the far side of the aperture 207 as indicated at 208 is planar. From such point 208 to the opposite corner 209 there is provided a feather or tapered surface as indicated by the angle dimension 210. From the opposite corner 212 to the point 213 on the far side of the core shaft 50 the wafer is planar and is then tapered to the corner 214 as indicated by the angle dimension 215. The configuration of the wafer of FIG. 8 not only reduces the gap dimension at the center of the core shaft as indicated at 216 but also provides as the wafers rotate a slight wobble action to assist in avoiding imprinting the extrudate with the gap. In any event, the wafers and segments may be covered with an elastic sleeve such as seen at 219 in FIGS. 5 and 8 to provide a smooth exterior configuration.

The Roller Drive—FIGS. 9–12

Figures 9, 10, 11, 12:
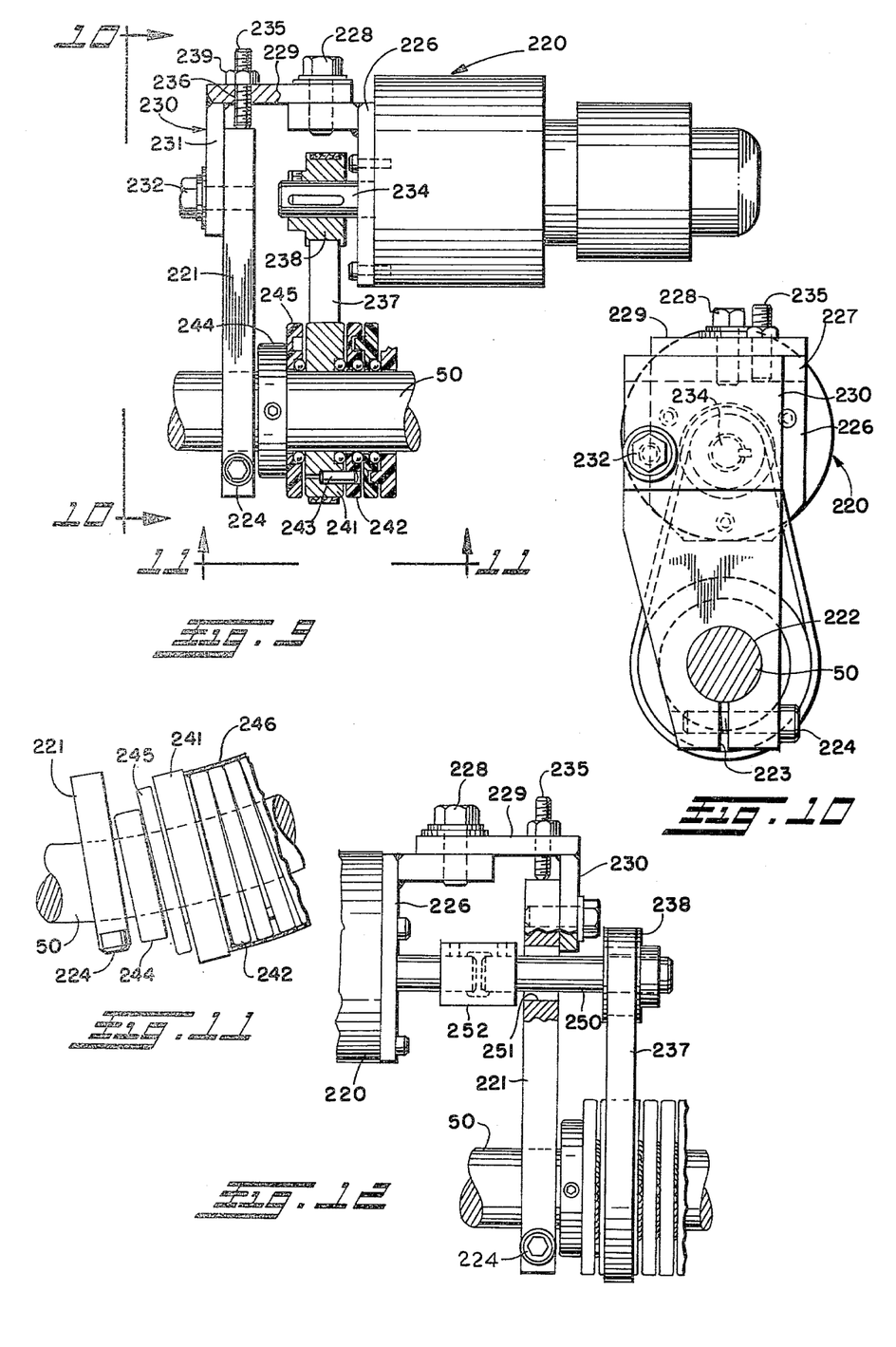
FIG. 9 is an enlarged fragmentary side elevation of a roller drive assembly which may be employed with each roller.
FIG. 10 is a vertical section taken substantially on the line 10—10 of FIG. 9 illustrating the motor and its support in elevation.
FIG. 11 is a fragmentary bottom plan view of the drive connection from the motor to the roller as seen from the line 11—11 of FIG. 9.
FIG. 12 is a view similar to FIG. 9 but illustrating the motor mounted on the opposite side of the support bracket, such alternative form of motor mounting being utilized for space considerations for alternate rolls.

Each of the individual curved rolls in both the upper and lower fan-shape array may be driven at controlled speed by the air motors 220 seen both in FIG. 1 and in detail in FIG. 9. The air motor is supported on the respective core shaft 50 by a clamp bracket plate 221 provided with a through bore 222, such bracket being split from the bore to the lower end thereof as indicated at 223 in FIG. 10. A clamp fastener 224 is employed firmly to secure the bracket to the core shaft 50 in the desired position.

The face of the motor 220 is provided with an inverted L-shape mounting bracket 226, the upper relatively short leg 227 of which is pivotally connected by clamping fastener 228 to the upper leg 229 of L-shape bracket 230, the vertical leg 231 of which is similarly pivotally clamped by fastener 232 offset from the shaft 234 of the motor 220. In this manner stud 235 threaded into tapped aperture 236 may be employed to pivot the bracket 230 about the axis of pivot fastener 232 to tighten timing belt 237 trained about drive sprocket 238 on the shaft 234. As indicated, the lower end of the adjusting screw 235 bears against the top edge of the plate bracket 221 and a lock nut 239 may be employed therewith.

The top pivot fastener 228 may be employed, particularly on the arcuate rolls of rather sharp curvature to provide a pivotal adjustment compensating for the shaft radius and to obtain the desired belt alignment between the drive sprocket 238 and the driven sprocket or drive hub 241. The driven sprocket may be suitably drivingly connected to the adjacent wafer 242 by one or more drive pins 243. Between the driven sprocket 241 journaled on the core shaft 50 and a stop collar 244 secured to the core shaft is a wafer 245 which serves as a thrust washer between the collar and the rotating sprocket. Subsequent wafers are then positioned on the core shaft to the extent desired and as seen more clearly in FIG. 2, the opposite end of the rotating part of the arcuate drive roller may terminate in a compression spring 247 bearing against a stop collar 248 secured to the core shaft.

As illustrated in FIG. 2, the drive motors 224 of adjacent core shafts may extend in the opposite direction for the sake of clearance and availability. When extending in the opposite direction as seen in FIG. 12 the motor shaft is provided with an extension 250 extending through rather large clearance opening 251 in the modified plate bracket 221.

The motors for opposed or paired arcuate rolls on opposite sides of the pass line may be driven at the same pressure through a common pressure regulator. Thus for the 10 rolls illustrated there will be five pressure regulators. Each motor may be approximately ⅛ horsepower with a reduction of 15:1.

Additional Wafer Embodiments—FIGS. 13–16

Figure 13:
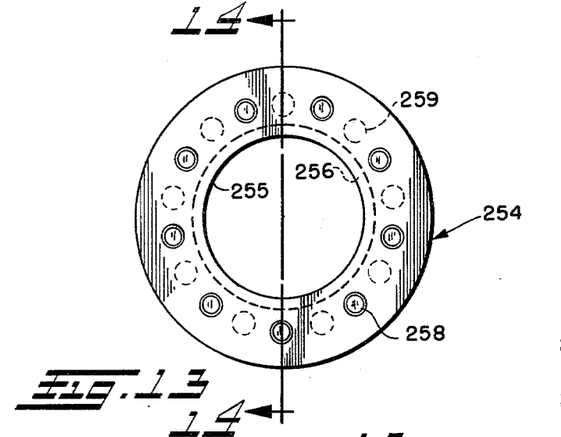
FIG. 13 is a plan view of another form of wafer which may be utilized with the present invention.
Figure 14:
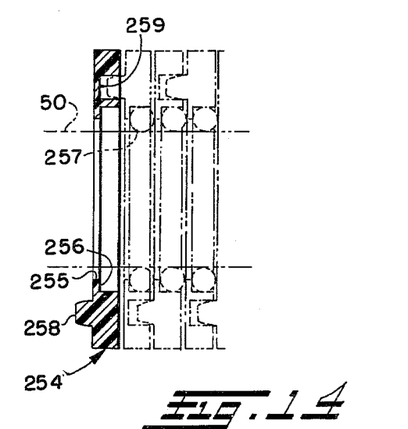
FIG. 14 is a diametral section of the wafer of FIG. 13 taken on the line 14—14 thereof and illustrating the manner in which the adjacent wafers cooperate to form a ball race.

As seen in FIGS. 13 and 14 there is provided a somewhat modified wafer embodiment which may be utilized with ball bearings. Each wafer is molded of the above-noted preferred plastic and includes a rather large central aperture 255 providing clearance with the O.D. of the core shaft. Adjacent the I.D. of the wafer there is provided a shoulder 256 accommodating bearing balls 257, such shoulder clamping the balls between the wafer shoulder and the adjacent wafer. Such wafers may be provided with tapered projecting pins 258 circumferentially alternating with recesses 259 on the opposite side of the wafer. The wafers 254 thus seen in FIG. 14 may be stacked together on the core shaft and the compression spring at the end will hold the wafers in the stacked condition maintaining the balls in place.

Figure 15:
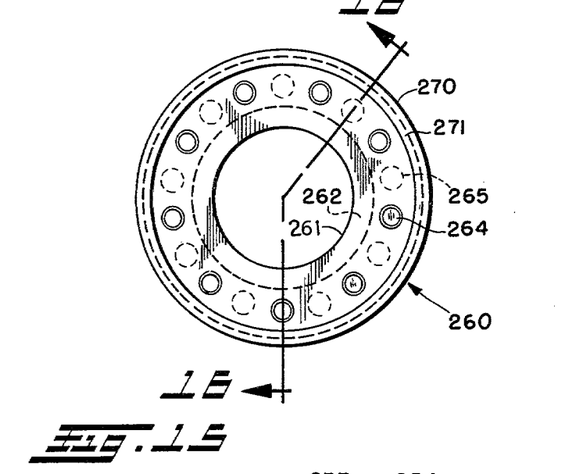
FIG. 15 is a plan view of another form of wafer which may be utilized with the present invention.
Figure 16:
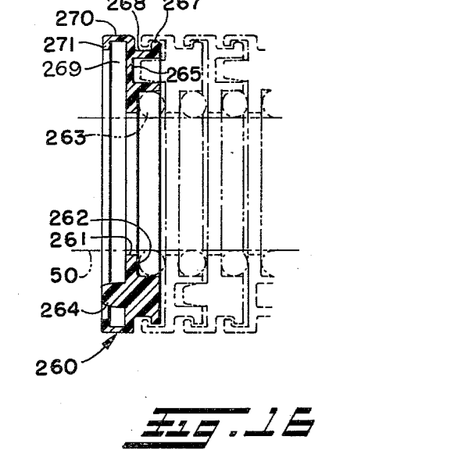
FIG. 16 is a sectional view of the wafer of FIG. 15 taken substantially on the line 16—16 thereof and illustrating the manner in which the wafers interfit and cooperate.

In FIGS. 15 and 16 there is shown a somewhat modified wafer 260 which, like the wafer 254, has an I.D. 261 providing clearance with the O.D. of the core shaft 50 and a shoulder 262 supporting the wafer on the shaft on ball bearings 263. The ball bearings are trapped between the shoulder and the adjacent wafer. Like the wafer 254, the wafer 260 is provided with tapered pins 264 interfitting with alternating recesses 265 on opposite sides of the wafer. However, the O.D. of the wafer is provided at one edge with a slight radial flange 267 adjacent which is an annular groove. The flange 267 is designed to snap within inwardly directed annular groove 269 at the opposite edge formed by axially extending flange 270 and radially inwardly directed relatively short terminal flange 271. The wafers 260 of FIGS. 15 and 16 may thus be snapped together to entrap the balls 263 therebetween and need not rely on the stacking pressure of one wafer against the other to hold the balls in place.

Figure 17:
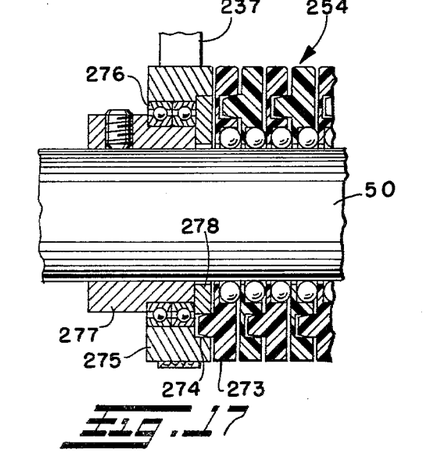
FIG. 17 is a transverse section taken through the drive hub of a roller illustrating another form of driving connection for the wafers.

In FIG. 17 the wafers 254 are illustrated stacked on the core shaft 50 with the initial wafer 273 being drivingly connected through its pins 258 to the recesses 274 of timing belt pulley assembly 275 which may be mounted on commercially available bearing assemblies 276 on shouldered hub 277. The bearings are held between the shoulder of the hub which is secured to the core shaft and bearing retainer 278 in which the recesses 274 are provided. The journal arrangement of FIG. 17 may be employed with commercially available bearings and preferably on relatively large diameter core shafts.

Figure 18:
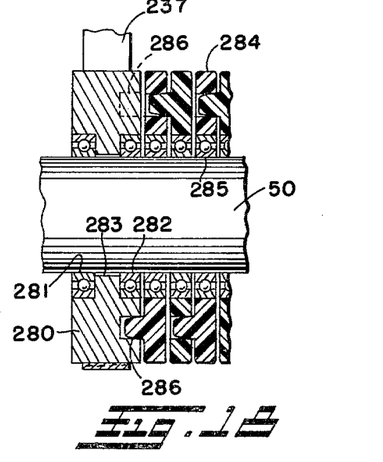
FIG. 18 is a similar transverse section of yet another form of driving connection for such roll assembly.

In FIG. 18 there is illustrated an alternative timing belt pulley arrangement wherein the timing belt pulley 280 is provided with again commercial bearing assemblies 281 and 282 provided in the shoulders at the axial ends of the I.D. 283 which provides clearance with the shaft 50. Also, as indicated, the wafers 284 may be provided with press fit roller bearing assemblies 285 on the interior thereof and stacked in the manner indicated with the pins of the wafers fitting in the holes of the adjacent wafers. The pulley 280 may be provided with recesses seen at 286 accommodating the pins of the adjacent wafer. In any event, it will be appreciated that a wide variety of wafer and bearing arrangements may be provided both for the wafers and the associated drive pulley.

Operation

In set up, the jack 113 will be employed to position the lower array of arcuate drive rolls 48 at the desired distance from the pass line 26 and the shims 132 and 133 will similarly be employed to position the bottom finishing assembly 121. The bottom arcuate rolls will be driven at the desired speed by their respective drive motors 220. The top rolls will also similarly be driven. The respective speeds of the various arcuate drive roll pairs may be closely adjusted.

Each of the piston cylinder assemblies 85 will be provided with controlled air pressure to the blind end thereof as indicated by the schematic diagram which is part of FIG. 3. Thus air may be supplied to the bottom of piston cylinder assembly 91 through the line 300 from source 301 through pressure regulator 302, pressure gauge 303, control valve 304 and flow control 305. In this manner a controlled amount of pressure may be provided to the blind end of the cylinder 91 elevating the roll 90 against its weight causing the roll essentially to float. When this floating condition has been achieved, the pressure now applied to the rod end through the line 307 from source 308 through series connected pressure regulator 309, gauge 310, quick exhaust control valve 311, and flow control valve 312 precisely controls the pressure of the roll against the foaming extrudate. Because of the different radius and size of each of the arcuate drive rolls, it will be appreciated that the pressure required to compensate for the tare weight or dead weight of each roll will differ. In any event, once such floating is achieved, the pressures applied to the respective rod ends of the cylinders will closely control the precise force application of the roll against the surface of the foaming and expanding extrudate moving thereagainst. Normally, only a slight pressure differential is achieved between the rod and the blind ends so that the force exerted by the roll on the extrudate is quite gentle.

For release, a release pressure regulator 314 is provided to avoid rapid descent in series with 2-way solenoid valve 315. The release pressure regulator may be common to all of the piston cylinder assemblies but for each there will be respective pressure regulators 302 and 309.

The piston cylinder assemblies 162 for the upper surface finisher assembly 120 are operated in the same manner. However, a somewhat higher differential pressure is employed to achieve the desired pressure per square inch of the surface finisher against the moving extrudate. Preferably, approximately 40 psi is desired with regard to the upper surface finishing assembly 120.

As seen by the phantom line positions 317 in FIG. 1, the upper array of arcuate drive rolls may achieve a successively higher elevation as the extrudate expands therebeneath. In any event, the extrudate is closely controlled both as to direction and shape without undue cell distortion.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A method of controlling and shaping a foaming extrudate exiting from a die orifice comprising the steps of adjustably positioning opposed sets of rolls each on opposite sides of the extrudate immediately downstream of the die orifice, and driving the rolls of at least one set for controlled rotation independently of the other rolls of said one set, said rolls being arcuate to extend substantially transversely of the path of the extrudate, and maintaining the plane of curvature of each roll parallel to the extrudate flow.

2. A method as set forth in claim 1 including driving such rolls with air pressure.

3. The method of claim 1 including the step of supporting each roll of at least one set independently of each other, and controlling the pressure of each roll of said one set toward the extrudate independently of the others.

4. The method of claim 3 including the step of compensating for the tare weight of each roll of said one set.

5. A method of controlling and shaping a foaming extrudate exiting from a die orifice comprising the steps of positioning opposed sets of rolls each on opposite sides of the extrudate immediately downstream of the die orifice, driving the rolls of at least one set for controlled rotation independently of the other rolls of said one set, said rolls being arcuate to extend substantially transversely of the path of the extrudate, and maintaining the plane of curvature of each roll parallel to the extrudate flow.

6. A method as set forth in claim 5 including driving opposed one rolls from each set at the same air pressure.

7. A method of controlling and shaping a foaming expanding extrudate exiting from a die orifice comprising the steps of positioning opposed sets of rolls each on opposite sides of the extrudate immediately downstream of the die orifice, controlling the pressure of each roll of at least one set toward the extrudate independently of the other rolls of said one set, said rolls being arcuate to extend substantially transversely of the path of the extrudate, and maintaining the plane of curvature of each roll parallel to the extrudate flow.

8. A method as set forth in claim 7 including the step of driving the rolls of at least one set for controlled rotation independently of the other rolls of said one set.

9. A method as set forth in claim 8 including driving such rolls with air pressure.

10. A method as set forth in claim 9 including driving opposed one rolls from each set at the same air pressure.

11. A method as set forth in claim 7 including the step of maintaining the plane of curvature of each roll parallel to the extrudate flow and to each other.

12. The method of claim 7 including the step of compensating for the tare weight of each roll of said one set.

13. In combination, a foam extrusion die having an orifice therein, shafts on opposite sides of the extrudate path and downstream of such orifice, and a plurality of thin wafers rotatably mounted on each shaft operative to form the extrudate as it is extruded from such orifice.

14. The combination of claim 13 wherein such orifice is in the form of a curved slot, and said shafts are also curved and with said wafers thereon form curved rolls.

15. The combination of claim 14 including two sets of rolls on opposite sides of the extrudate path.

16. The combination of claim 15 wherein said sets of rolls each form a fan-shape array of rolls on opposite sides of the extrudate path.

17. The combination of claim 15 wherein one set of rolls includes means individually urging each roll thereof independently toward the extrudate.

18. The combination of claim 17 including means to compensate for the tare weight of each roll of said one set.

19. The combination of claim 17 wherein the other set of rolls includes means to adjust the rolls thereof as a unit toward and away from the extrudate.

20. The combination of claim 15 wherein said one set of rolls includes means to adjust the rolls thereof as a unit toward and away from the extrudate.

21. The combination of claim 13 including drive means to rotate said wafers.

22. The combination of claim 21 wherein said drive means comprises a motor.

23. The combination set forth in claim 22 including an air motor for each shaft.

24. The combination set forth in claim 13 wherein said wafers are drivingly interconnected.

25. The combination set forth in claim 13 wherein said wafers are covered by an elastomeric sleeve.

26. The combination set forth in claim 13 wherein said wafers include an I.D. bearing surface riding directly on its respective shaft.

27. The combination set forth in claim 13 wherein adjacent wafers cooperate to form a ball race.

28. The combination set forth in claim 14 wherein said wafers are radially feathered to compensate for the curvature of said shafts.

29. The combination set forth in claim 28 wherein said wafers are drivingly interconnected by integrally formed pins cooperating with holes in adjacent wafers.

30. The combination set forth in claim 14 wherein said shafts are arcuate and each has a radius struck substantially from the center of curvature of such orifice.

31. An extrudate forming apparatus adapted to be positioned adjacent the extrusion die comprising shafts positioned on opposite sides of the extrudate path immediately downstream of the extrusion die orifice, said shafts extending transversely of the extrudate flow path, and a plurality of rotatable wafers on said shafts operative to form and confine the extrudate.

32. Apparatus as set forth in claim 31 wherein said shafts are curved and with said wafers thereon form curved rolls.

33. Apparatus as set forth in claim 32 including sets of curved rolls on each side of the extrudate path.

34. Apparatus as set forth in claim 33 wherein the rolls of each set have an increasing radius of curvature downstream of the die orifice.

35. Apparatus as set forth in claim 33 wherein the rolls of one set are individually movable toward and away from the extrudate path, and means operative to exert a predetermined force on each roll of said one set urging the same toward the extrudate.

36. Apparatus as set forth in claim 35 including means to compensate for the weight of each roll of said one set.

37. Apparatus as set forth in claim 36 wherein each roll of said one set is supported from a movable yoke, and respective piston-cylinder means moving each yoke.

38. Apparatus as set forth in claim 37 including fluid control means for each piston-cylinder assembly operative to supply fluid at controlled pressure to one side of the piston to compensate for the tare weight of the roll, and fluid at somewhat higher controlled pressure to the other side of the piston to urge the roll toward the extrudate at the desired pressure.

39. Apparatus as set forth in claim 37 wherein each yoke includes a pair of parallel guide rods, each rod supporting an opposite end of a curved roll.

40. A plastic foam extrudate forming apparatus adapted to be positioned adjacent the extrusion die comprising opposed sets of curved rolls each positioned on opposite sides of the extrudate path immediately downstream of the extrusion die orifice, the rolls of each set extending transversely of the extrudate flow path and having an increasing radius of curvature downstream of the die orifice.

41. Apparatus as set forth in claim 40 wherein the rolls of one set are individually movable toward and away from the extrudate path, and means operative to exert a predetermined force on each roll of said one set urging the same toward the extrudate.

42. Apparatus as set forth in claim 41 including means to compensate for the weight of each roll of said one set.

43. Apparatus as set forth in claim 42 wherein each roll of said one set is supported from a movable yoke, and respective piston-cylinder means moving each yoke.

44. Apparatus as set forth in claim 43 including fluid control means for each piston-cylinder assembly operative to supply fluid at controlled pressure to one side of the piston to compensate for the tare weight of the roll, and fluid at somewhat higher controlled pressure to the other side of the piston to urge the roll toward the extrudate at the desired pressure.

45. Apparatus as set forth in claim 43 wherein each yoke includes a pair of parallel guide rods, each rod supporting an opposite end of a curved roll.

46. A surface finisher for foam extrudate comprising opposed extrudate engaging planar surfaces positioned on opposite sides of the extrudate pass line, means operative adjustably yet fixedly supporting one of said surfaces, and support means operative adjustably and floatingly supporting the other of said surfaces at a controlled pressure, said support means being pivotally connected to said other of said surfaces substantially at its center of gravity.

47. A finisher as set forth in claim 46 wherein said support means comprises a pair of arms pivotally distally connected to said other of said surfaces.

48. A finisher as set forth in claim 47 including a counterweight on said arms.

49. A finisher as set forth in claim 47 including piston-cylinder means operative to pivot said arms to move said other finisher toward and away from the extrudate.

50. A finisher as set forth in claim 49 including fluid control means for said piston-cylinder, means operative to supply fluid at controlled pressure to one side of the piston to compensate for the tare weight of said other finisher, and fluid at somewhat higher controlled pressure to the other side of the piston to urge said other finisher toward the extrudate at the desired pressure.

51. A finisher as set forth in claim 46 wherein each surface comprises glass cloth impregnated with a high lubricity resin.

52. A finisher as set forth in claim 51 wherein each surface is in the form of a moving belt.

53. A finisher as set forth in claim 52 whrein each belt includes a planar slider plate on the opposite side as the extrudate.

54. A curved shaft roll for shaping plastic extrudate comprising a stationary core shaft having a curved portion and a plurality of juxtaposed relatively thin wafers on said core shaft journaled for rotation thereon at the curved portion of the core shaft, each wafer being drivingly connected to an adjacent wafer, and means to drive one of said wafers and thus all of said wafers for rotation about the curved portion of said core shaft, said wafers being journaled on said core shaft with rotating bearings, said bearings being balls, adjacent wafers including I.D. recesses forming races for said balls, and adjacent wafers cooperating with the recesses to hold the balls in place.

55. A shaft roll as set forth in claim 54 including a drive motor for said roll supported on said core shaft, and means adjustably to pivot said motor to place the axis thereof parallel to a tangent to the curved portion of the core shaft at the drive connection.

56. A shaft roll as set forth in claim 55 including endless drive means from the motor to the core shaft, and means to move the motor toward and away from the core shaft to adjust the tightness of the endless drive means.

57. A shaft roll as set forth in claim 56 including means to pivot said motor on its suport parallel to but offset from its axis thus to adjust the tightness of the drive means.

58. A shaft roll as set forth in claim 54 wherein said wafers are formed from two mating parts which when joined form recesses for the balls.

59. A shaft roll as set forth in claim 54 wherein said wafers are radially feathered to compensate for the curvature of the core shaft.

60. A shaft roll as set forth in claim 59 wherein said wafers are uniformly symmetrically feathered from the I.D. thereof.

61. A shaft roll as set forth in claim 59 wherein said wafers are asymmetrically feathered.

62. A shaft roll as set forth in claim 50 wherein the wafers are drivingly interconnected by integrally formed pins cooperating with holes in adjacent wafers.

63. A shaft roll as set forth in claim 62 wherein said pins are tapered.

64. A shaft roll as set forth in claim 54 wherein said wafers are integrally formed of molded plastic having a high degree of lubricity.

65. In combination, an extrusion die having an orifice therein, shafts on opposite sides of the extrude path and downstream of such orifice, and a plurality of thin wafers on said shafts rotatably mounted thereon operative to form the extrudate as it is extruded from such orifice, such orifice being in the form of an arcuate slot, said shafts being also arcuate and each having a radius struck substantially from the center of curvature of such orifice, there being two sets of arcuate shafts on opposite sides of the extrudate path, and the plane of curvature of each set of arcuate shafts being parallel to the plane of curvature of the die orifice.

66. An extrudate forming apparatus adapted to be positioned adjacent the extrusion die comprising shafts positioned on opposite sides of the extrudate path immediately downstream of the extrusion die orifice, said shafts extending transversely of the extrudate flow path, and a plurality of rotatable wafers on said shafts operative to form and confine the extrudate, said shafts being curved and with said wafers thereon forming curved rolls, there being sets of said curved rolls on each side of the extrudate path, and the rolls of each set each having a plane of curvature parallel to the extrudate path.

67. An extrudate forming apparatus adapted to be positioned adjacent the extrusion die comprising shafts positioned on opposite sides of the extrudate path immediately downstream of the extrusion die orifice, said shafts extending transversely of the extrudate flow path, and a plurality of rotatable wafers on said shafts operative to form and confine the extrudate, said shafts being curved and with said wafers thereon forming curved rolls, there being sets of said curved rolls on each side of the extrudate path, and the rolls of one set having a common plane of curvature parallel to the extrudate path and being adjustable as a unit toward and away from such path.

68. An extrudate forming apparatus adapted to be positioned adjacent the extrusion die comprising curved rolls positioned on opposite sides of the extrudate path immediately downstream of the extrusion die orifice, said rolls extending transversely of the extrudate flow path, there being sets of curved rolls on each side of the extrudate path, and the rolls of each set having a plane of curvature parallel to the extrudate path.

69. An extrudate forming apparatus adapted to be positioned adjacent the extrusion die comprising curved rolls positioned on opposite sides of the extrudate path immediately downstream of the extrusion die orifice, said rolls extending transversely of the extrudate flow path, there being sets of curved rolls on each side of the extrudate path, and the rolls of one set having a common plane of curvature parallel to the extrudate path and being adjustable as a unit toward and away from such path.

* * * * *

UNITED STATES PATENT AND TRADEMARK OFFICE
CERTIFICATE OF CORRECTION

PATENT NO. : 4,234,529
DATED : November 18, 1980
INVENTOR(S) : Arthur L. Phipps

It is certified that error appears in the above—identified patent and that said Letters Patent is hereby corrected as shown below:

Assignee: please change "Condec Corporation of Old Greenwich, Connecticut" to -- U.C. Industries of Tallmadge, Ohio --.

Signed and Sealed this

Seventh Day of April 1981

[SEAL]

Attest:

RENE D. TEGTMEYER

Attesting Officer

Acting Commissioner of Patents and Trademarks